No. 840,862. PATENTED JAN. 8, 1907.
E. J. NELSON.
TRENCH SHOVEL.
APPLICATION FILED AUG. 8, 1906.
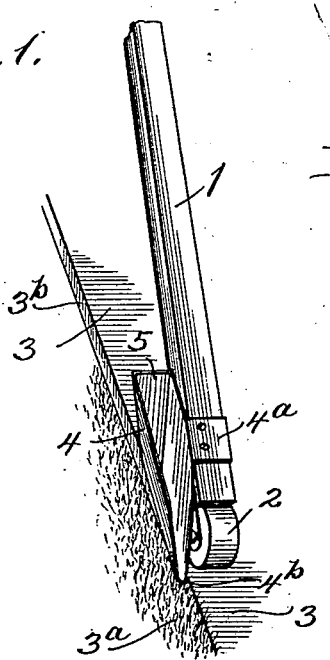
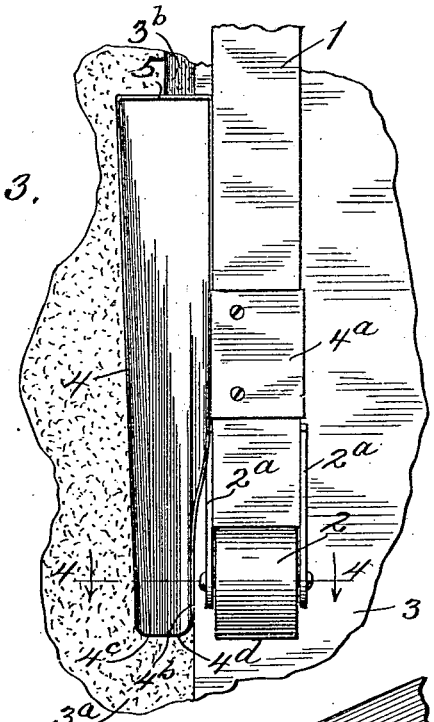
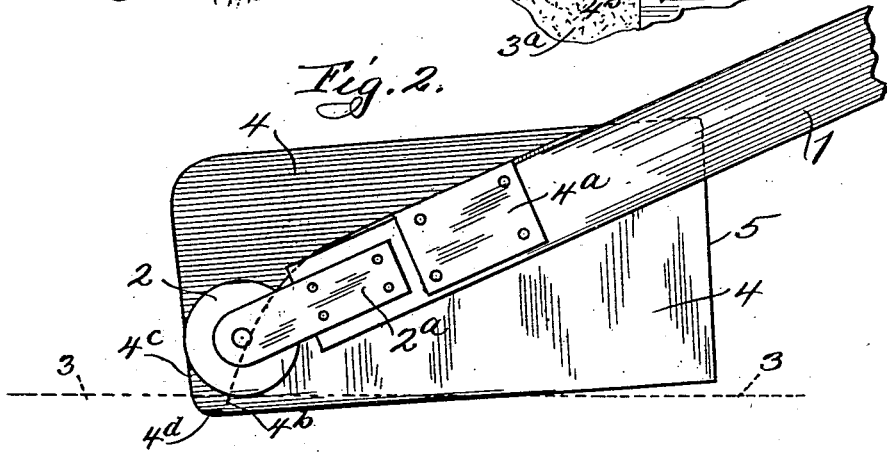
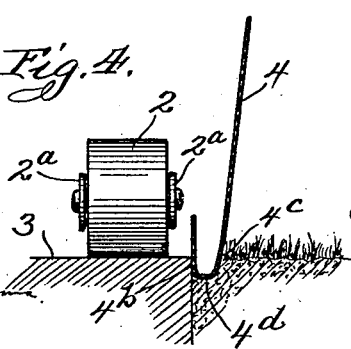
Witnesses:
Inventor:
Erik John Nelson
By Jno. H. Whipple
Atty.

UNITED STATES PATENT OFFICE.

ERIK JOHN NELSON, OF CHICAGO, ILLINOIS.

TRENCH-SHOVEL.

No. 840,862.            Specification of Letters Patent.            Patented Jan. 8, 1907.

Application filed August 8, 1906. Serial No. 329,669.

*To all whom it may concern:*

Be it known that I, ERIK JOHN NELSON, of Chicago, in the county of Cook and State of Illinois, have invented certain new and useful Improvements in Trench-Shovels, of which the following is a specification.

My invention relates to improvements in implements for trimming the grass-plot and cutting a small trench between the grass-plot and the edge of a stone sidewalk bordering upon the same; and the objects of my improvements are, first, to provide an implement for cutting a margin of the lawn along the edge of the sidewalk where it fringes over upon the same, and, second, to provide means for taking up that portion of the sod so cut away, in this manner forming a narrow channel between the lawn and the sidewalk and freeing the sidewalk from that portion of the earth removed and the grass projecting over the margin of the walk. I attain these objects by the means illustrated in the accompanying drawings, in which—

Figure 1 is a perspective view looking obliquely at the implement as in operation and from that side which lies toward the lawn. Fig. 2 is an enlarged detail showing the implement in side elevation as looked at from the opposite side of that shown in Fig. 1. Fig. 3 is a detail showing an enlarged view in plan or top view. Fig. 4 is a detail showing a cross-section on line 4 4 of Fig. 3, including a fragment of the sidewalk and adjacent lawn.

In the drawings the numeral 1 designates the pole or handle for operating the tool. The end of the handle is provided with a roller 2, journaled in metal straps $2^a$, attached to the end of the handle-bar, whereby the roller is adapted to travel along on the sidewalk 3.

The trench-shovel 4 comprises a wedge-shaped box-like structure which is open at the top and which is made of sheet metal. On one side it is provided with an eyepiece $4^a$, which is adapted to fit over and be bolted to the handle 1 in such manner as to firmly attach such shovel to the handle, so that the bottom edge or wedge-shaped side of the front end shall project below the roller and down below the upper surface of the sidewalk, having one side $4^b$ adapted to pass in between the sidewalk and the adjacent lawn $3^a$ and the other side $4^c$ and the extreme lower part $4^d$ provided with a cutting edge, which is adapted to cut a strip of the sod along the edge of the sidewalk about one inch and a half wide, more or less, forming a groove $3^b$.

The rear end 5 of the shovel is closed up, so that the margin of the sod cut away slides back as the tool is pushed along on the sidewalk until the shovel-box is filled more or less with the accumulation, and when full it is dumped into a wheelbarrow, which the operator is presumed to have along for that purpose.

By the use of this implement the fringing edge of the lawn upon the sidewalk can be removed with greater facility and much greater rapidity than by the use of any other means known to me for the purpose.

I do not claim the article as comprising a carriage and a V-shaped trimming-blade connected thereto and provided with a discharge-chute at the rear end thereof and projected to one side, the carriage being supported at the front and rear upon rollers and having a handle pivotally connected to the carriage at the center thereof, whereby as the device is pushed forward the earth and grass removed will be fed along through the V-shaped trimmer-blade and discharged at the rear end, the discharge taking place along in a row upon the walk or path and being afterward collected. My invention is distinguished from this by having a roller attached at the end of the handle-bar and a light box-like structure closed at the rear and provided with a V-shaped cutting edge at the front and rigidly attached to the handle, so that when pushed forward the earth and grass removed will be collected in the box until the box is full, when it can be lifted by the handle and emptied into a wheelbarrow or other receptacle after the manner of working with an ordinary hand-shovel.

Having thus described my invention and the manner of using the same, I claim—

In a tool of the class described, the combination with a handle-bar provided with a roller at one end, of a light box-like structure closed at the rear end and mounted rigidly upon the handle-bar and having a narrow open front end provided with a V-shaped cutting edge projecting below and to one side of the roller, as and for the purpose specified.

ERIK JOHN NELSON.

Witnesses:
ANNIE M. ADAMS,
RAY ELIASSOF.